United States Patent
Locher et al.

(10) Patent No.: US 9,856,923 B2
(45) Date of Patent: Jan. 2, 2018

(54) METHOD FOR ACTUATING A HYDRAULIC MEDIUM SUPPLY SYSTEM OF AN AUTOMATIC TRANSMISSION

(71) Applicant: ZF Friedrichshafen AG, Friedrichshafen (DE)

(72) Inventors: Karl Locher, Pfronstetten-Tigerfeld (DE); Alexander Hoffmann, Lebach (DE); Rainer Novak, Bregenz (AT); Martin-Joachim Bader, Mochenwangen (DE); Markus Terwart, Thundorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 15/123,635

(22) PCT Filed: Feb. 6, 2015

(86) PCT No.: PCT/EP2015/052480
§ 371 (c)(1),
(2) Date: Sep. 3, 2016

(87) PCT Pub. No.: WO2015/132036
PCT Pub. Date: Sep. 11, 2015

(65) Prior Publication Data
US 2017/0074333 A1    Mar. 16, 2017

(30) Foreign Application Priority Data

Mar. 6, 2014    (DE) .................... 10 2014 204 067

(51) Int. Cl.
*F16H 61/00* (2006.01)
*F16D 48/02* (2006.01)
(Continued)

(52) U.S. Cl.
CPC .......... *F16D 25/14* (2013.01); *F16D 25/123* (2013.01); *F16H 57/0412* (2013.01);
(Continued)

(58) Field of Classification Search
CPC .... F16D 25/14; F16D 25/123; F16H 61/0025; F16H 57/0494; F16H 57/0441;
(Continued)

(56) References Cited

U.S. PATENT DOCUMENTS 6,848,548 B2 * 2/2005 Alfredsson ......... F16H 61/0025
192/3.25
8,187,151 B2    5/2012 Gloge
(Continued)

FOREIGN PATENT DOCUMENTS

| DE | 2518103 A1 | 11/1976 |
|---|---|---|
| DE | 102008040665 A1 | 6/2010 |
| DE | 102011075411 A1 | 11/2012 |

OTHER PUBLICATIONS

German Search Report DE102014204067.1, dated Jun. 26, 2015. 9 pages.

(Continued)

*Primary Examiner* — David J Hlavka
(74) *Attorney, Agent, or Firm* — Dority & Manning, P.A.

(57) ABSTRACT

A method for controlling a hydraulic fluid supply system of an automatic transmission of a motor vehicle includes supplying the hydraulic fluid supply system with hydraulic fluid from at least one of a hydraulic pump controlled on an engine side and a hydraulic pump controlled on a gear set side. The method also includes controlling a retaining valve of the hydraulic fluid supply system as a function of detected motor vehicle parameters in order to set an adjusted power (Continued)

distribution with the hydraulic pump controlled on the engine side and the hydraulic pump controlled on the gear set side.

7 Claims, 2 Drawing Sheets

(51) Int. Cl.
   *F16D 25/12* (2006.01)
   *F16H 57/04* (2010.01)
(52) U.S. Cl.
   CPC ..... *F16H 57/0435* (2013.01); *F16H 57/0441* (2013.01); *F16H 57/0446* (2013.01); *F16H 57/0494* (2013.01); *F16H 61/0025* (2013.01); *F16H 61/0031* (2013.01); *F16H 2061/0037* (2013.01)
(58) Field of Classification Search
   CPC ............. F16H 57/0435; F16H 57/0412; F16H 57/0446; F16H 61/0031; F16H 2061/0037
   See application file for complete search history.

(56) References Cited

U.S. PATENT DOCUMENTS

| | | | |
|---|---|---|---|
| 8,763,736 B2* | 7/2014 | Mochiyama | F16H 61/0031 180/338 |
| 2003/0116396 A1* | 6/2003 | Kuhstrebe | F16D 13/644 192/48.9 |
| 2004/0074732 A1* | 4/2004 | Busold | F16D 21/06 192/48.601 |
| 2010/0018808 A1* | 1/2010 | Gloge | F16H 61/0031 184/6.12 |
| 2012/0279210 A1 | 11/2012 | Strauss | |
| 2012/0290158 A1* | 11/2012 | Yoshikawa | B60K 6/48 701/22 |
| 2014/0371012 A1* | 12/2014 | Moriyama | F16H 61/00 474/28 |

OTHER PUBLICATIONS

International Search Report (English Translation) PCT/EP2015/052480, dated May 20, 2015. 2 pages.

* cited by examiner

METHOD FOR ACTUATING A HYDRAULIC MEDIUM SUPPLY SYSTEM OF AN AUTOMATIC TRANSMISSION

FIELD OF THE INVENTION

The present invention relates generally to a method for controlling a hydraulic fluid supply system of an automatic transmission of a motor vehicle.

BACKGROUND

Automatic transmissions require at least one hydraulic fluid supply system for the hydraulic fluid supply of transmission elements, such as shift elements or the like. For the hydraulic fluid supply of the system, one hydraulic pump controlled on the engine side and one hydraulic pump controlled on the transmission output side or on the gear set side are typically provided. The provided hydraulic pumps may be allocated to separate hydraulic fluid circuits or systems, such that the hydraulic pump controlled on the engine side is used to generate system pressure and the hydraulic pump controlled on the gear set side is used to cool the gear set. Thus, the hydraulic pumps operate structurally separate oil circuits or hydraulic fluid supply circuits, and thus are not able to support each other. Allocating the hydraulic pumps to a common hydraulic fluid supply circuit is also known.

In a disadvantageous manner, it has been found that, with certain operating modes of the motor vehicle, such a hydraulic fluid supply, for example, does not make available system pressure for actuating shift elements, such that, during predetermined operating modes, due to a lack of system pressure, gear tracking or clutch filling (for example) is not possible.

SUMMARY OF THE INVENTION

Exemplary aspects of the present invention control a hydraulic fluid supply system of the type described above, which ensures a consumption-optimized control of the hydraulic fluid supply system of the automatic transmission.

A method for controlling one or more hydraulic fluid supply systems of an automatic transmission, in particular a dual-clutch transmission, of a motor vehicle is proposed, whereas the hydraulic fluid supply system is supplied with hydraulic fluid at least by one hydraulic pump controlled on the engine side and by one hydraulic pump controlled on the gear set side. A retaining valve of the hydraulic fluid supply system for oil or hydraulic fluid supply is controlled as a function of detected motor vehicle parameters or the like for setting an adjusted consumption-optimized power distribution with the hydraulic pumps.

Accordingly, the respective operating mode of the motor vehicle is initially determined, and, as a function of the detected operating mode, a suitable control of the hydraulic pumps through the retaining valve is realized, in order to thereby undertake a consumption-optimized power distribution with the hydraulic pumps for the hydraulic fluid supply. For example, the motor vehicle parameters can be detected by the electronic transmission control and evaluated accordingly, in order to recognize the operating modes, which are stored as models. The retaining valve is controlled according to the predetermined operating modes, and thus occupies different shift positions.

For example, different operating modes can be detected with the proposed method. A first operating mode is, for example, an activated coasting function for a motor vehicle. This means that the motor vehicle is moved or coasts with a drive train that is not force-fitting. The fundamental advantage is that, upon coasting without the engine running and thus the zero delivery of the hydraulic pump controlled on the engine side that results from this, for example of a vane pump, the hydraulic pump controlled on the gear set side, based on the corresponding control, takes over the maintaining of a limited system pressure. With this reduced system pressure, for example, gears can be tracked and couplings can be filled. A second operating mode is, for example, the activated coasting function with the engine running. A third operating mode is the normal operation of the motor vehicle in the non-coasting state. Additional operating modes can be detected by the method in accordance with exemplary aspects of the invention.

BRIEF DESCRIPTION OF THE DRAWINGS

The present invention is further described below with reference to the drawings. The following is shown.

DETAILED DESCRIPTION

Figure 1:
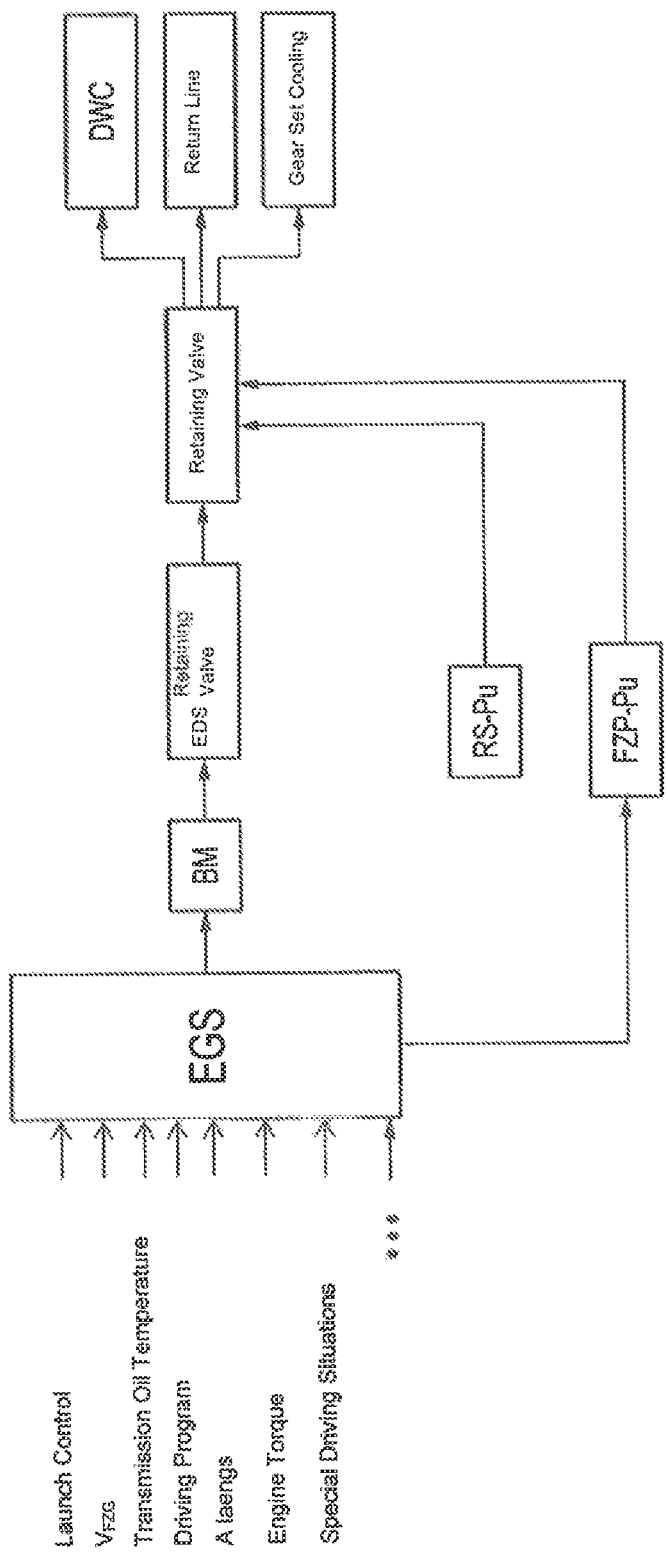
FIG. 1 a schematic view of a hydraulic fluid supply system of an automatic transmission of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 schematically presents an example of a hydraulic fluid supply system for an automatic transmission, in particular a dual-clutch transmission, of a motor vehicle. The hydraulic fluid supply system comprises a hydraulic circuit, which is provided for cooling and actuating, along with the lubrication of transmission elements of the automatic transmission. The hydraulic fluid circuit is supplied with hydraulic fluid or oil through a hydraulic pump FZP-Pu controlled on the drive side and a hydraulic pump RS-Pu controlled on the gear set side. The hydraulic fluid circuit is connected to a return line to the oil cooler and to the hydraulic fluid sump. In the hydraulic fluid supply system, a retaining valve, with which the volume flows can be regulated, is also arranged. The retaining valve is controlled by an electric pressure regulator EDS.

Through the electronic transmission control EGS, various motor vehicle parameters are detected and evaluated. Based on the evaluated motor vehicle parameters, a corresponding operating mode BM, such as BM1, BM2, or BM3, is determined. Within the framework of the flow chart presented as an example, as the first operating mode BM1, the driving state is detected with the activated coasting function without the engine running, while, as the second operating mode BM2, the driving state is detected with the activated coasting function without the engine running, thus with an activated drive motor or internal combustion engine. With the third operating mode BM3, the coasting function is deactivated. Accordingly, the motor vehicle is in the normal, non-coast driving condition.

Corresponding control models for the retaining valve are allocated to the respective operating mode BM1, BM2, BM3, whereas the corresponding control takes place by the electric pressure regulator EDS. In this manner, corresponding shift positions are set with the retaining valve, such that the hydraulic fluid supply, for example, for the supply of the dual-clutch DWC, for the cooling and lubrication of the gear set or the like, is ensured, whereas excess hydraulic fluid is allocated to the return line, thus to the cooler and/or the sump.

For the hydraulic fluid supply of hydraulic fluid supply system, both a hydraulic pump or a vane pump FZP-Pu controlled on the engine side and a hydraulic pump RS-Pu controlled on the gear set side are allocated.

As possible motor vehicle parameters, the electronic transmission control EGS, for example, the launch control, the motor vehicle speed $V_{FZG}$, the transmission oil temperature, the respective driving program, the motor vehicle longitudinal acceleration a_laengs, the engine torque, special driving situations, such as (for example) start-stop operation and increased slip operation or the like, may be detected.

Figure 2:
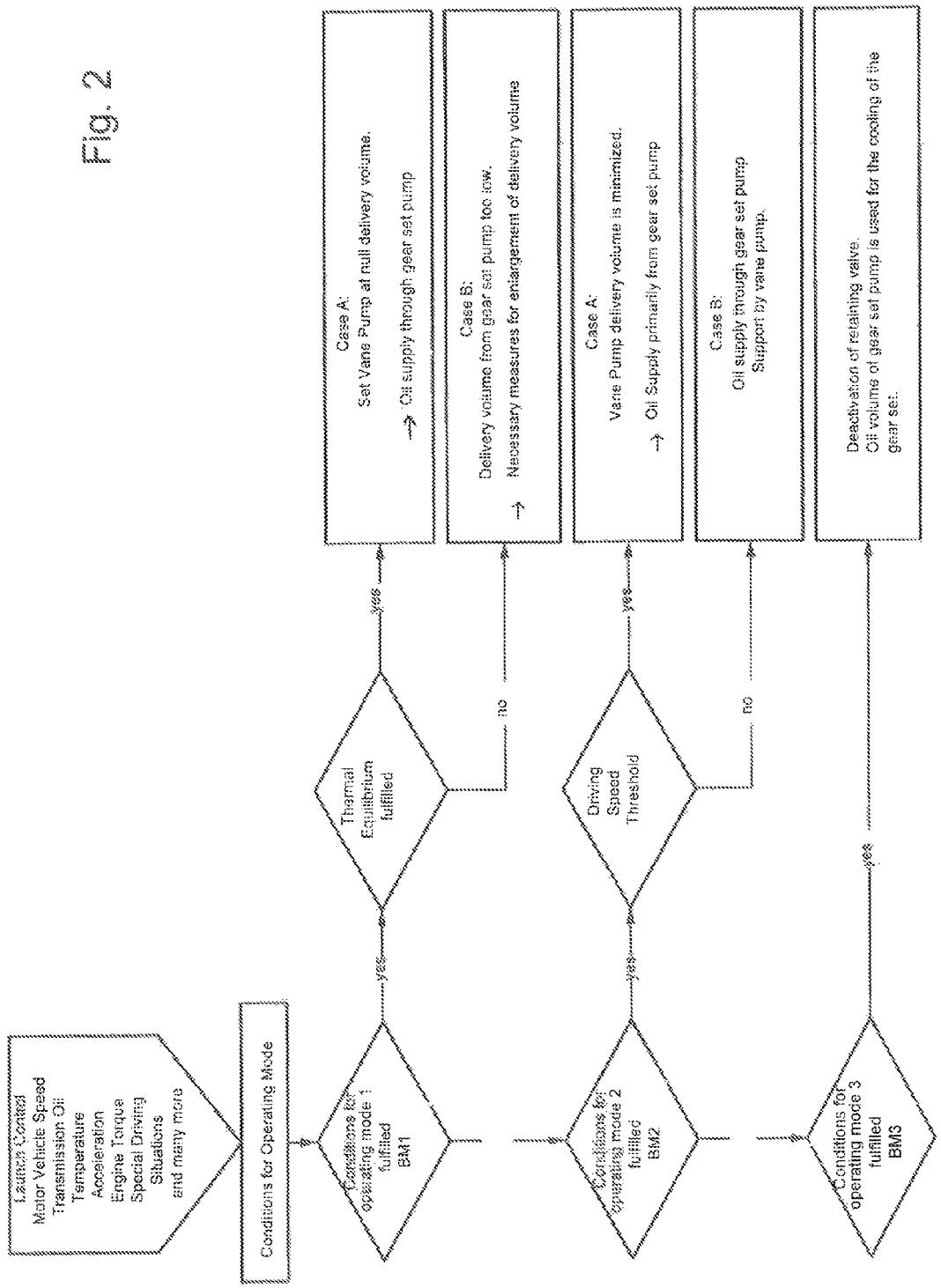
FIG. 2 a schematic view of a possible flow chart of the method in accordance with exemplary aspects of the invention for controlling the hydraulic fluid supply system.

FIG. 2 presents an example of a corresponding flow chart of the proposed method or the proposed approach. Initially, the conditions for the existence of a corresponding operating mode BM1, BM2, BM3 are determined from the detected motor vehicle parameters.

If the conditions for the first operating mode BM1 are fulfilled and thermal equilibrium is also present, through the vane pump or through the hydraulic pump FZP-Pu controlled on the engine side, the delivery volume is reduced to zero, and the supply of hydraulic fluid or oil is carried out by the hydraulic pump RS-Pu controlled on the gear set side.

In this operating mode BM1, no volume flow of oil is generated by the hydraulic pump or vane pump FZP-Pu controlled on the engine side. The retaining valve is supplied at a maximum by the electric pressure regulator EDS with inverse characteristics. It follows from this that the retaining valve is regulated by spring force. This results in a higher hydraulic resistance and thus an increase in the pressure of the hydraulic pump RS-PU controlled on the gear set side. In this driving state, the hydraulic pump RS-PU controlled on the gear set side may produce a system pressure of approximately three and a half (3.5) bar depending on the spring force of the retaining valve. With this system pressure, with the internal combustion engine at a standstill, the gear tracking and clutch filling can be carried out. This represents a significant performance improvement upon a withdrawal from coasting; that is, upon the ending of the coasting function with the motor vehicle. In this driving situation, the excess volume flow of hydraulic fluid flows through the return line to the oil cooler or to the hydraulic fluid sump.

If there is no thermal equilibrium in the operating mode BM1, the delivery volume of the hydraulic pump RS-Pu controlled on the gear set side is too low, such that an enlargement of the delivery volume is initiated as a necessary measure. Thus, in driving situations in which the thermal equilibrium is no longer ensured, due to the insufficient delivery volume of the hydraulic pump RS-Pu controlled on the gear set side, an engine start request is issued to the engine control. Thus, the vane pump or the hydraulic pump FZP-Pu controlled on the engine side supports the hydraulic pump RS-Pu controlled on the gear set side.

If the conditions for the second operating mode BM2 are met and the motor vehicle speed $V_{FZG}$ has also exceeded a predetermined threshold, the delivery volume of the hydraulic pump FZP-Pu controlled on the engine side is minimized, and the supply of hydraulic fluid or oil is carried out primarily by the hydraulic pump RS-Pu controlled on the gear set side.

In this operating mode BM2, the motor vehicle coasts with a predetermined vehicle speed $V_{FZG}$, at which the delivery capacity of the hydraulic pump RS-Pu controlled on the gear set side is sufficient for maintaining the thermal equilibrium of the gear set. Accordingly, the delivery capacity of the hydraulic pump FZP-Pu controlled on the engine side can be minimized, for example, for coasting with engaged gears. At a minimum system pressure, the gear set pump RS-Pu may also be used for coasting exit processes, for example, for filling the clutches. Furthermore, the excess volume flow of cooling oil flows to the oil cooler.

If the conditions for the second operating mode BM2 are met and the predetermined speed threshold is also not reached, the oil supply is carried out by the hydraulic pump RS-Pu controlled on the gear set side with the support of the hydraulic pump FZP-Pu controlled on the drive side.

In this operating mode BM2, the motor vehicle coasts at a low vehicle speed, for example, less than twenty (20) km/h. In this driving state, the delivery capacity of the hydraulic pump RS-Pu controlled on the gear set side is no longer sufficient for maintaining the system pressure. At that point, the retaining pressure valve is accordingly supplied, such that the hydraulic pump FZP-Pu controlled on the engine side may supplement the volume flow of oil up to the predetermined target volume flow.

If the conditions for the third operating mode BM3 are met, the retaining valve is deactivated, whereas the volume flow of cooling oil is used by the hydraulic pump RS-Pu controlled on the gear set side for cooling the gear set.

In this operating mode BM3, the retaining valve is pressed to the end stop through the corresponding supplying of the electric pressure regulator EDS. This means that the functionality of the retaining valve is deactivated. In this position, the retaining valve is opened and the volume flow of cooling oil from the hydraulic pump RS-Pu controlled on the gear set side is used for cooling the gear set. This has the advantage that, in this position, the hydraulic pump RS-Pu controlled on the gear set side has minimal losses.

Modifications and variations can be made to the embodiments illustrated or described herein without departing from the scope and spirit of the invention as set forth in the appended claims.

The invention claimed is:

1. A method for controlling a hydraulic fluid supply system of an automatic transmission of a motor vehicle, comprising:
supplying the hydraulic fluid supply system with hydraulic fluid from at least one of a first hydraulic pump driven on an engine side and a second hydraulic pump driven on a gear set side;
controlling a retaining valve of the hydraulic fluid supply system as a function of detected motor vehicle parameters in order to set an adjusted power distribution with the first hydraulic pump and the second hydraulic pump; and
determining a prevailing operating mode of the motor vehicle for the retaining valve as a function of the detected motor vehicle parameters,
wherein controlling the retaining valve comprises controlling the retaining valve such that supplying the hydraulic fluid supply system with hydraulic fluid is exclusively carried out by the second hydraulic pump when the prevailing operating mode is a first operating mode and when a gear set of the automatic transmission is in thermal equilibrium, the motor vehicle coasting without a running engine in the first operating mode, wherein controlling the retaining valve further comprises controlling the retaining valve such that supplying the hydraulic fluid supply system with hydraulic fluid is carried out by the second hydraulic pump supported by the first hydraulic pump when the prevailing operating mode is the first operating mode and when the gear set of the automatic transmission is not in thermal equilibrium.

2. The method of claim 1, wherein controlling the retaining valve comprises controlling the retaining valve such that supplying the hydraulic fluid supply system with hydraulic fluid is primarily carried out by the second hydraulic pump and a minimum volume flow is delivered by the first hydraulic pump when the prevailing operating mode is a second operating mode and when a predetermined vehicle speed is reached, the motor vehicle coasting with a running engine in the second operating mode.

3. The method of claim 2, wherein controlling the retaining valve comprises controlling the retaining valve such that supplying the hydraulic fluid supply system with hydraulic fluid is carried out by the second hydraulic pump supported by the first hydraulic pump when the prevailing operating mode is the second operating mode and when the predetermined vehicle speed is not reached.

4. The method of claim 1, wherein controlling the retaining valve comprises deactivating the retaining valve such that a volume flow of the second hydraulic pump cools a gear set of the automatic transmission when the prevailing operating mode is a third operating mode, the motor vehicle not coasting in the third operating mode.

5. A method for controlling a hydraulic fluid supply system of an automatic transmission of a motor vehicle, comprising:

supplying the hydraulic fluid supply system with hydraulic fluid from at least one of a hydraulic pump driven on an engine side and a second hydraulic pump driven on a gear set side;

controlling a retaining valve of the hydraulic fluid supply system as a function of detected motor vehicle parameters in order to set an adjusted power distribution with the first hydraulic pump and the second hydraulic pump; and determining a prevailing operating mode of the motor vehicle for the retaining valve as a function of the detected motor vehicle parameters, wherein controlling the retaining valve comprises controlling the retaining valve such that supplying the hydraulic fluid supply system with hydraulic fluid is primarily carried out by the second hydraulic pump and a minimum volume flow is delivered by the first hydraulic pump when the prevailing operating mode is a second operating mode and when a predetermined vehicle speed is reached, the motor vehicle coasting with a running engine in the second operating mode.

6. The method of claim 5, wherein controlling the retaining valve comprises controlling the retaining valve such that supplying the hydraulic fluid supply system with hydraulic fluid is carried out by the second hydraulic pump supported by the first hydraulic pump when the prevailing operating mode is the second operating mode and when the predetermined vehicle speed is not reached.

7. A method for controlling a hydraulic fluid supply system of an automatic transmission of a motor vehicle, comprising:

supplying the hydraulic fluid supply system with hydraulic fluid from at least one of a hydraulic pump driven on an engine side and a second hydraulic pump driven on a gear set side;

controlling a retaining valve of the hydraulic fluid supply system as a function of detected motor vehicle parameters in order to set an adjusted power distribution with the first hydraulic pump and the second hydraulic pump; and determining a prevailing operating mode of the motor vehicle for the retaining valve as a function of the detected motor vehicle parameters, wherein controlling the retaining valve comprises deactivating the retaining valve such that a volume flow of the second hydraulic pump cools a gear set of the automatic transmission when the prevailing operating mode is a third operating mode, the motor vehicle not coasting in the third operating mode.

* * * * *